(12) United States Patent
Bookstaff

(10) Patent No.: US 8,130,928 B2
(45) Date of Patent: Mar. 6, 2012

(54) METHOD AND SYSTEM FOR NUMBER INDEXING FOR ADVERTISING

(76) Inventor: Blake Bookstaff, Knoxville, TN (US)

(*) Notice: Subject to any disclaimer, the term of this patent is extended or adjusted under 35 U.S.C. 154(b) by 1398 days.

(21) Appl. No.: 11/636,211

(22) Filed: Dec. 8, 2006

(65) Prior Publication Data

US 2007/0130030 A1    Jun. 7, 2007

Related U.S. Application Data

(63) Continuation-in-part of application No. 10/303,903, filed on Nov. 26, 2002, now Pat. No. 7,187,761.

(60) Provisional application No. 60/424,311, filed on Nov. 7, 2002.

(51) Int. Cl.
*H04M 3/42* (2006.01)

(52) U.S. Cl. .............................. 379/201.01; 379/213.01

(58) Field of Classification Search ............. 379/201.01, 379/204.01, 211.03, 213.01, 213.02; 370/352, 370/356
See application file for complete search history.

(56) References Cited

U.S. PATENT DOCUMENTS

| | | |
|---|---|---|
| 3,928,724 A | 12/1975 | Byram et al. |
| 4,053,949 A | 10/1977 | Recca et al. |
| 4,071,698 A | 1/1978 | Barger, Jr. et al. |
| 4,232,199 A | 11/1980 | Boatwright et al. |
| 4,446,337 A | 5/1984 | Cofer |
| 4,451,704 A | 5/1984 | Winkelman |
| 4,608,460 A | 8/1986 | Carter et al. |
| 4,654,482 A | 3/1987 | DeAngelis |
| 4,791,666 A | 12/1988 | Cobb et al. |
| 4,850,007 A | 7/1989 | Marino et al. |
| 4,897,866 A | 1/1990 | Majmudar et al. |
| 4,918,719 A | 4/1990 | Daudelin |
| 4,943,995 A | 7/1990 | Daudelin et al. |
| 4,959,855 A | 9/1990 | Daudelin |
| 4,975,941 A | 12/1990 | Morganstein et al. |
| 4,979,206 A | 12/1990 | Padden et al. |
| 5,131,024 A | 7/1992 | Pugh et al. |
| 5,377,354 A | 12/1994 | Scannell |
| 5,425,097 A | 6/1995 | Pula |
| 5,448,625 A | 9/1995 | Lederman |
| 5,473,671 A | 12/1995 | Partridge, III |
| 5,475,746 A | 12/1995 | Miller et al. |
| 5,485,511 A | 1/1996 | Iglehart et al. |

(Continued)

FOREIGN PATENT DOCUMENTS

EP         1 662 366 A1    5/2006

(Continued)

OTHER PUBLICATIONS

Webwasher Corn AG (Mar. 28, 2000), XP-002156461: Siemens-Backed WebWasher Empowers Companies to Remove Unwanted Web Content and Ensure Privacy Protection, Internet Citation, URL:http//www.seomoz.org/blogdetail.php?I, 2 pages.

(Continued)

*Primary Examiner* — William Deane, Jr.
(74) *Attorney, Agent, or Firm* — Lesavich High-Tech Law Group, P.C.; Stephen Lesavich

(57) ABSTRACT

A method and system for number indexing for advertising. Alphanumeric identifiers (e.g., telephone number, voice-over-Internet Protocol identifier, an Internet Protocol identifier, an instant message identifier or an e-mail address identifier) are used to categorize and associate pre-determined advertising with the alphanumeric identifiers. When the alphanumeric identifier is received on a communications network, the pre-determined advertising associated with the alphanumeric identifier is sent to a target device.

20 Claims, 3 Drawing Sheets

U.S. PATENT DOCUMENTS

| | | | |
|---|---|---|---|
| 5,515,098 | A | 5/1996 | Carles |
| 5,544,236 | A | 8/1996 | Andruska et al. |
| 5,619,562 | A | 4/1997 | Maurer et al. |
| 5,642,407 | A | 6/1997 | He |
| 5,652,784 | A | 7/1997 | Blen et al. |
| 5,661,788 | A | 8/1997 | Chin |
| 5,701,419 | A | 12/1997 | McConnell |
| 5,734,710 | A | 3/1998 | Hirth et al. |
| 5,751,802 | A | 5/1998 | Carr et al. |
| 5,757,899 | A | 5/1998 | Boulware et al. |
| 5,802,149 | A | 9/1998 | Hanson |
| 5,825,862 | A | 10/1998 | Voit et al. |
| 5,835,570 | A | 11/1998 | Wattenbarger |
| 5,852,775 | A | 12/1998 | Hidary |
| 5,873,032 | A | 2/1999 | Cox et al. |
| 5,875,231 | A | 2/1999 | Farfan et al. |
| 5,878,338 | A | 3/1999 | Alperovich et al. |
| 5,880,770 | A | 3/1999 | Ilcisin et al. |
| 5,892,820 | A | 4/1999 | Armstrong |
| 5,943,410 | A | 8/1999 | Shaffer et al. |
| 5,966,437 | A | 10/1999 | Cox et al. |
| 5,983,544 | A | 11/1999 | Fagan |
| 6,031,904 | A | 2/2000 | An et al. |
| 6,035,190 | A | 3/2000 | Cox et al. |
| 6,038,307 | A | 3/2000 | Fahrer et al. |
| 6,061,439 | A | 5/2000 | Bleile et al. |
| 6,084,628 | A | 7/2000 | Sawyer |
| 6,104,786 | A | 8/2000 | Gibilisco et al. |
| 6,118,860 | A | 9/2000 | Hillson et al. |
| 6,178,446 | B1 | 1/2001 | Gerszberg et al. |
| 6,188,751 | B1 | 2/2001 | Scherer |
| 6,198,812 | B1 | 3/2001 | Weber |
| 6,205,215 | B1 | 3/2001 | Dombakly |
| 6,256,515 | B1 | 7/2001 | Cox et al. |
| 6,301,338 | B1 | 10/2001 | Makela |
| 6,301,342 | B1 | 10/2001 | Ander et al. |
| 6,310,948 | B1 | 10/2001 | Nemeth |
| 6,324,273 | B1 | 11/2001 | Alcott |
| 6,327,343 | B1 | 12/2001 | Epstein et al. |
| 6,327,344 | B1 | 12/2001 | Paxson |
| 6,347,225 | B1 | 2/2002 | Nishiyama |
| 6,353,852 | B1 | 3/2002 | Nestoriak, III et al. |
| 6,381,320 | B1 | 4/2002 | Creamer et al. |
| 6,400,804 | B1 | 6/2002 | Bilder |
| 6,456,709 | B1 | 9/2002 | Cox et al. |
| 6,473,612 | B1 | 10/2002 | Cox et al. |
| 6,504,912 | B1 | 1/2003 | Glossbrenner |
| 6,516,311 | B1 | 2/2003 | Yacoby |
| 6,587,138 | B1 | 7/2003 | Vogt et al. |
| 6,587,549 | B1 | 7/2003 | Weik |
| 6,590,970 | B1 | 7/2003 | Cai et al. |
| 6,597,769 | B2 | 7/2003 | Snow |
| 6,614,896 | B1 | 9/2003 | Rao |
| 6,618,474 | B1 | 9/2003 | Reese |
| 6,633,850 | B1 | 10/2003 | Gabbard |
| 6,668,281 | B1 | 12/2003 | Ayyadurai |
| 6,718,551 | B1 | 4/2004 | Swix et al. |
| 6,856,673 | B1 | 2/2005 | Banks et al. |
| 6,965,919 | B1 | 11/2005 | Woods et al. |
| 6,977,997 | B2 | 12/2005 | Shioda et al. |
| 7,013,323 | B1 | 3/2006 | Thomas |
| 7,100,199 | B2 | 8/2006 | Ginter |
| 7,187,761 | B2 | 3/2007 | Bookstaff |
| 7,227,936 | B2 | 6/2007 | Bookstaff |
| 2001/0012344 | A1 | 8/2001 | Kwon |
| 2002/0044639 | A1 | 4/2002 | Shioda et al. |
| 2002/0049968 | A1 | 4/2002 | Wilson et al. |
| 2002/0051521 | A1 | 5/2002 | Patrick |
| 2002/0091566 | A1 | 7/2002 | Siegel |
| 2002/0107730 | A1 | 8/2002 | Bernstein |
| 2002/0193095 | A1 | 12/2002 | Hutcheson et al. |
| 2002/0194061 | A1 | 12/2002 | Himmel et al. |
| 2003/0007620 | A1 | 1/2003 | Elsey et al. |
| 2003/0033198 | A1 | 2/2003 | Flannery et al. |
| 2003/0041126 | A1 | 2/2003 | Buford et al. |
| 2003/0050837 | A1 | 3/2003 | Kim |
| 2003/0063721 | A1 | 4/2003 | Hirose |
| 2003/0161464 | A1 | 8/2003 | Rodriguez et al. |
| 2003/0177063 | A1 | 9/2003 | Currans et al. |
| 2003/0212710 | A1 | 11/2003 | Guy |
| 2003/0223563 | A1 | 12/2003 | Wolmuth |
| 2003/0231754 | A1 | 12/2003 | Stein et al. |
| 2004/0023644 | A1 | 2/2004 | Montemer |
| 2004/0039786 | A1 | 2/2004 | Horvitz et al. |
| 2004/0107125 | A1 | 6/2004 | Guheen et al. |
| 2005/0182673 | A1 | 8/2005 | Marzian et al. |
| 2005/0216457 | A1 | 9/2005 | Walther |
| 2006/0161524 | A1 | 7/2006 | Roy |

FOREIGN PATENT DOCUMENTS

| | | |
|---|---|---|
| WO | WO 00/38399 A | 6/2000 |
| WO | WO 01/47264 A | 6/2001 |
| WO | WO 2004/029759 | 4/2004 |
| WO | WO 2004/042525 | 5/2004 |
| WO | WO 2007/024868 A2 | 3/2007 |

OTHER PUBLICATIONS

"Yahoo Block" Internet Citation, [Online] (Jun. 18, 2005), XP-002413362 Retrieved from the Internet: URL:http://www.seomoz.ort/blogdetail.php?I D=206> [retrieved on Jan. 3, 2007] the whole document.
Partial PCT Search Report PCT/US2005/023,495.
Partial PCT Search Report PCT/US2007/024,995.
Partial European Search Report EP 08 01 8481 Dated: Nov. 28, 2008.
http://gmail.google.com, Jun. 16, 2004, retrived on Feb. 14, 2007 at http://archive.org/web/web.php by Canadian Patent Office.
Partial Canadian Patent Office Search Report 2,569,529, dated Feb. 22, 2007.
Partial PCT Search Raped PCT/US2003/035,617, filed Nov. 7, 2003.

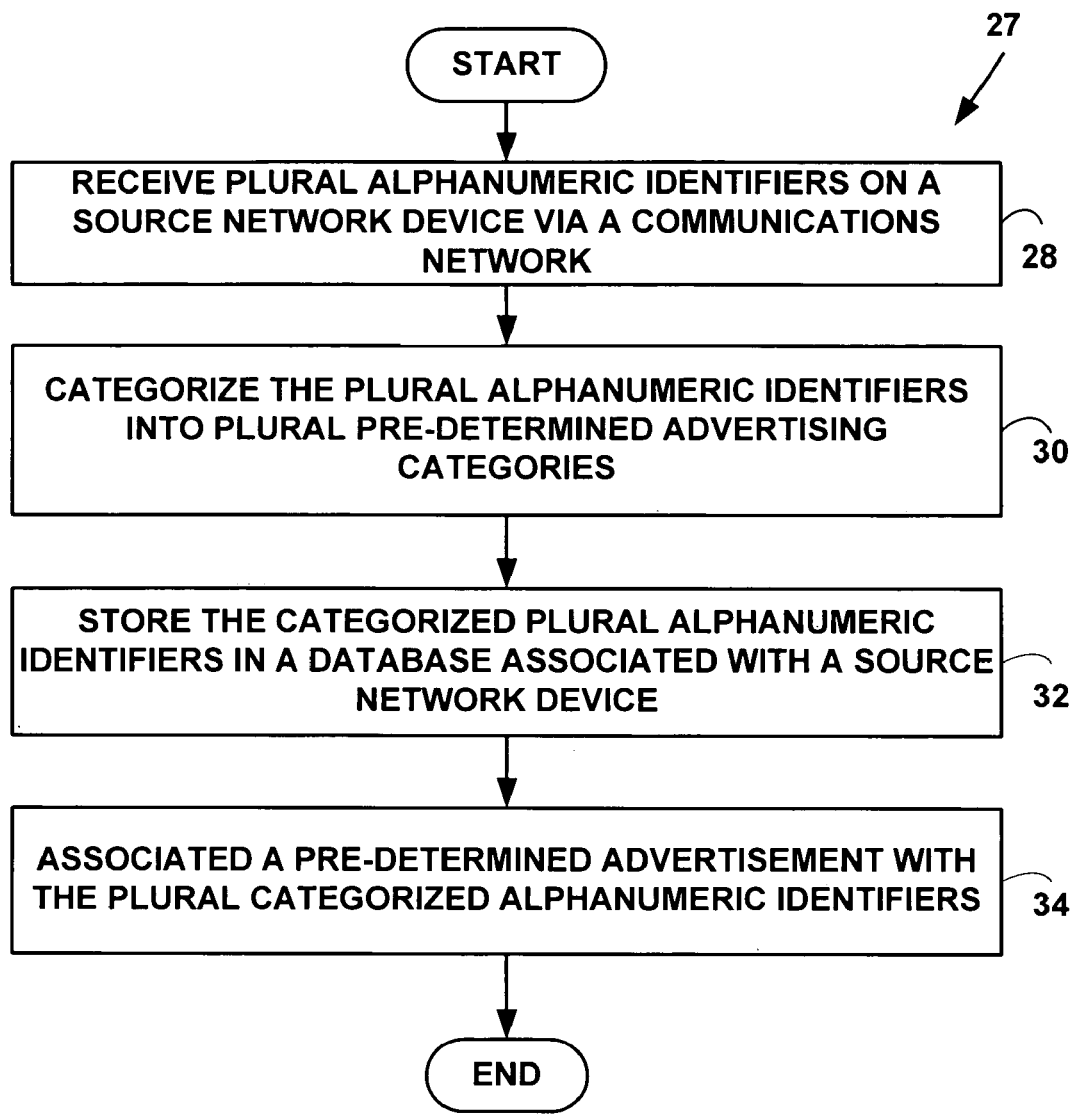

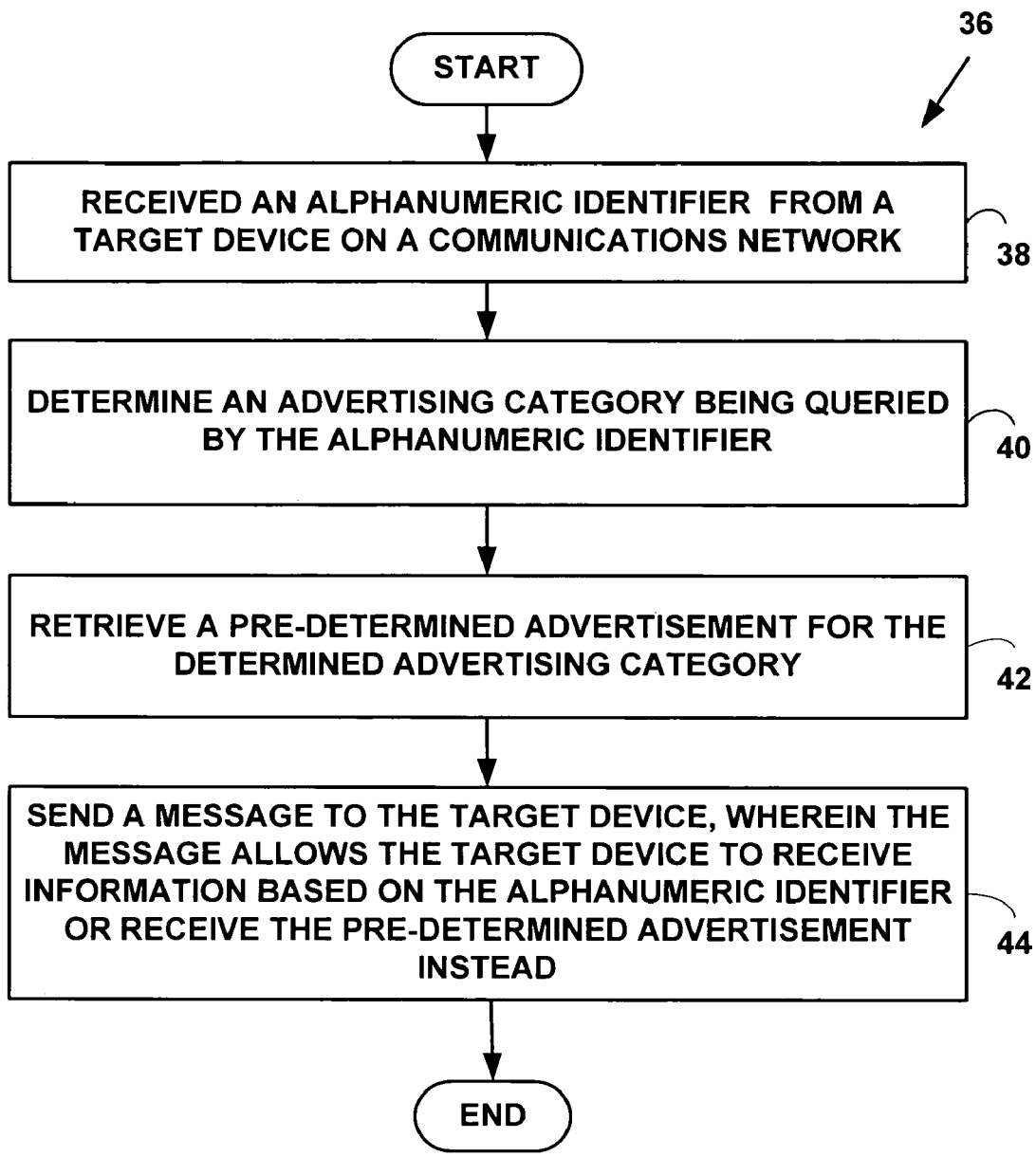

METHOD AND SYSTEM FOR NUMBER INDEXING FOR ADVERTISING

CROSS REFERENCES TO RELATED APPLICATIONS

This application is a Continuation-In-Part (CIP) of U.S. application Ser. No. 10/303,903, filed Nov. 26, 2002, that claims priority to U.S. Provisional patent application 60/424,311, filed Nov. 7, 2002, the contents of all of which are incorporated by reference.

FIELD OF INVENTION

This application relates to automatic processing of electronic information. More specifically, it relates to a method and system for number indexing for advertising.

BACKGROUND OF THE INVENTION

The Internet and World-Wide-Web have changed the way organizations conduct business. Virtually every organization has a web-site that provides information about the organization and a description of the goods and/or services an organization may offer. As is known in the art, a "web-site" is a group of related mark-up language documents and associated graphics and multi-media files, scripts, and databases, etc. that are served up by a server on the World-Wide-Web via the Internet. Business organizations also provide an electronic commerce (e-commerce) interface that allows users to purchase goods and/or services from such organizations.

There are many different type of web-sites on a spectrum ranging from very simple to very complex. Designing, implementing and deploying a web-site requires knowledge of markup languages such as Hyper Text Markup Language (HTML), eXtensible Markup Language (XML), programming languages such as JAVA, C++, C#, computer graphics functionality, multi-media functionality, etc. A knowledge of communications protocols such as Hyper Text Transfer Protocol (HTTP), Transmission Control Protocol (TCP), Internet Protocol (IP), e-mail protocols such as Simple Mail Transfer Protocol (SMTP), e-commerce protocols, encryption and other security protocols and many other types of protocols for various kinds of web functionalities.

With the proliferation of cell phones and other technology, the payphone and traditional telephone industry has seen a rapid decline in revenue including advertising revenues.

There have been attempts to solve some of the problems associated with electronic advertising. U.S. Published Application No. 20020107730, entitled "Method and apparatus for identifying customers for delivery of promotional materials," that was published by Bernstein discloses "a method and apparatus are provided for identifying potential customers for delivery of promotional materials. The method includes the steps of forming a customer profile by a vendor for targeting delivery of the promotional materials to potential customers, identifying customers which match the customer profile within a database of a third party and forwarding promotional materials to the identified customers.

For example, U.S. Published Patent Application No. 20030231754, entitled "Telephone call redirection system," that was published by Stein et al. discloses "telephone call redirection system for misdialed telephone numbers is provided. When a caller physically and unintentionally dials one of a set of first numbers subscribed to by the system, the system recognizes the number intended by the caller, and provides the caller with the option of being redirected. If interested, the caller dials another number offered by the system to hear of the desired, intended number."

U.S. Published Application No. 20030177063 entitled "Custom data ADS," that was published by Currrans et al. discloses "aspects of the present invention provide methods, a computer system, a computer medium and an article of manufacture for generating personalized advertising to accompany information to be sent to a user. In one embodiment, the method includes the steps of maintaining, in memory, a plurality of user profiles and a plurality of images associated with each user profile and selecting an image associated with the user. Next, the image is inserted into advertising to provide personalized advertising."

U.S. Pat. No. 5,642,407 that issued to He et al. entitled "System and method for selected audio response in a telecommunications network" teaches "a system and method for selected audio response to a telephone call that results in an unsuccessful connection. If a condition within the set of conditions is satisfied based on attributes associated with the caller or the telephone call, an action list associated with the satisfied condition is executed. The action list can comprise a selected audio response that is transmitted to the caller of the unsuccessful connection."

However, none of these attempts solve all of the problems associated with electronic advertising. Thus, it is desirable to provide method and system for improved advertising from telephones and via the Internet or other communications networks.

SUMMARY OF THE INVENTION

In accordance with preferred embodiments of the invention, some of the problems associated with electronic advertising are overcome. A method and system for number indexing for advertising is presented.

A method and system for number indexing for advertising. Alphanumeric identifiers (e.g., telephone number, voice-over-Internet Protocol identifier, an Internet Protocol identifier, an instant message identifier or an e-mail address identifier) are used to categorize and associate pre-determined advertising with the alphanumeric identifiers. When the alphanumeric identifier is received on a communications network, the pre-determined advertising associated with the alphanumeric identifier is sent to a target device.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 2 is a flow diagram illustrating a method for number indexing for advertising; and FIG. 3 is a flow diagram illustrating a method for using indexed alphanumeric identifiers.

DETAILED DESCRIPTION OF THE INVENTION

Examplery Electronic Information Message Processing System

Figure 1:
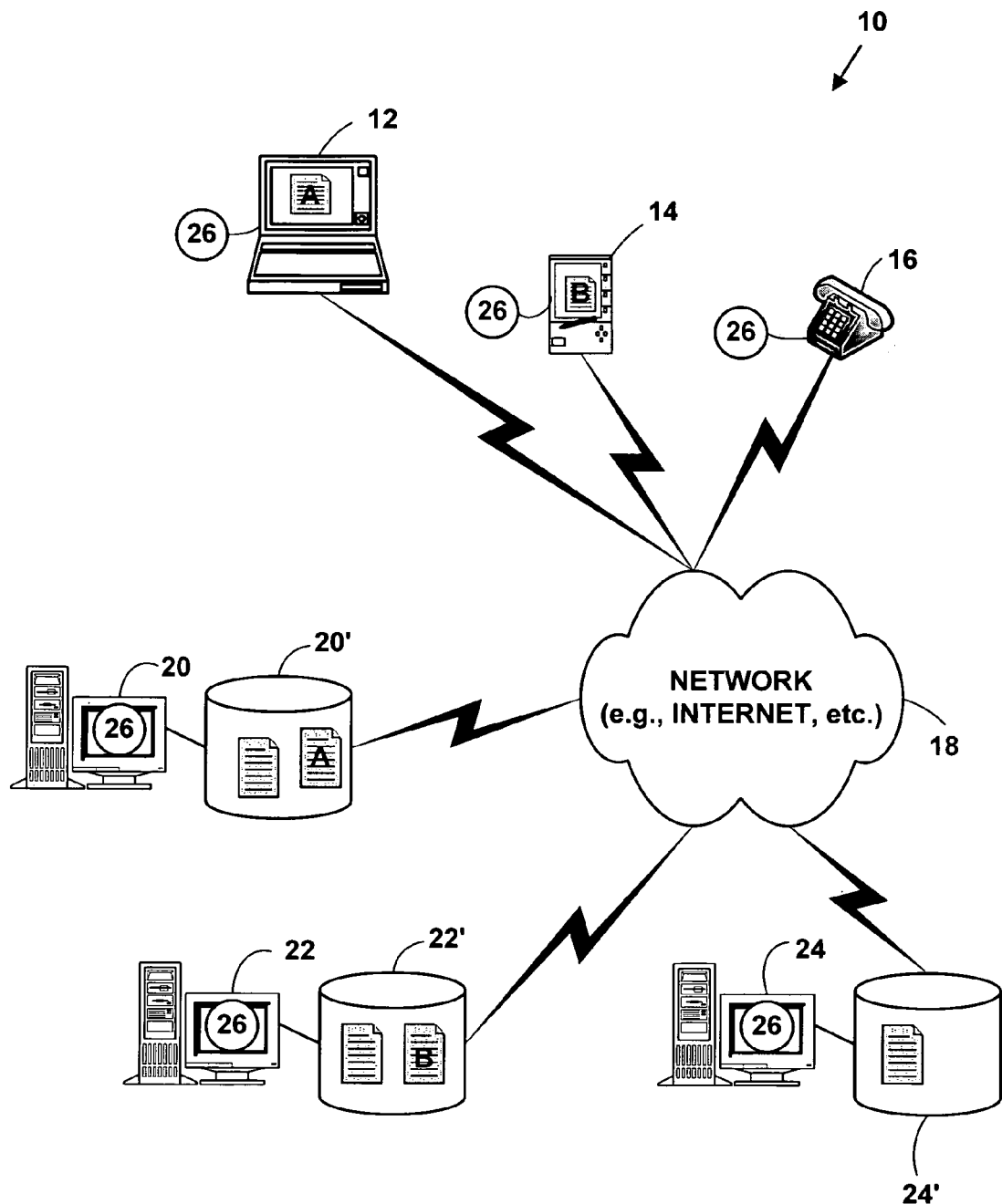
FIG. 1 is a block diagram illustrating an exemplary electronic information processing system.

FIG. 1 is a block diagram illustrating an exemplary electronic information system 10. The exemplary electronic information message processing system 10 includes, but is not limited to, one or more target network devices 12, 14, 16 (only three of which are illustrated). The target network devices 12, 14, 16 include, but are not limited to, non-mobile computers, wireless devices, laptop computers, mobile phones, non-mobile phones, pay telephones, personal information devices, personal digital/data assistants (PDA), handheld devices, network appliances, Internet appliances, two-way pagers, etc. However, the present invention is not limited to these target electronic devices and more, fewer or others types of target electronic devices can also be used. The target network devices 12, 14, 16 function as client devices in some instances and server devices in other instances.

The target network devices 12, 14, 16 are in communications with a communications network 18. The communications network 18 includes, but is not limited to, the Internet, an intranet, a wired Local Area Network (LAN), a wireless LAN (WiLAN), a Wide Area Network (WAN), a Metropolitan Area Network (MAN), Public Switched Telephone Network (PSTN) and other types of wired and wireless communications networks 18 providing voice, video and data communications with wired or wireless communication protocols.

Plural server network devices (source network devices) 20, 22, 24 (only three of which are illustrated) include one or more associated databases 20', 22', 24'. The plural source network devices 20, 22, 24 are in communications with the one or more target network devices 12, 14, 16 via the communications network 18. The plural source network devices 20, 22, 24, include, but are not limited to, electronic mail (e-mail) servers, World Wide Web servers, Internet servers, file servers, other types of electronic information servers, and other types of server network devices (e.g., edge servers, firewalls, routers, gateways, switches, etc.).

The communications network 18 may include one or more gateways, routers, bridges, switches. As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments. Switches typically operate at the data link layer and sometimes the network layer and therefore support virtually any packet protocol.

In one embodiment, the target network devices 12, 14, 16 and the source network devices 20, 22, 24 include an advertising application 26 with plural software modules. The multiple software modules may be implemented in firmware, hardware or any combination thereof. In one embodiment, the target network devices 12, 14, 16 may include a plug-in 28 for a browser with plural software modules.

In another embodiment, a non-mobile target network device (e.g., a payphone, etc.), includes a smart chip with plural software modules in communications with the communications network 18. In one embodiment the smart chip is programmed specifically for a home geographic area for the target network device. In another embodiment, the target network device is mobile. As the target network device is moved to a new geographic area, the smart chip communicates with the communications network 18 to receive dynamic advertising information that is based on the geographic area.

The communications network 18 may also include one or more servers or access points (AP) including wired and wireless access points (WAP) (not illustrated).

The communications network 18 includes data networks using the Transmission Control Protocol (TCP), User Datagram Protocol (UDP), Internet Protocol (IP) and other data protocols.

The communications network 18 may also include wired interfaces connecting portions of a PSTN or cable television network that connect the network devices 12, 14, 16 via one or more twisted pairs of copper wires, coaxial cable, fiber optic cable, other connection media or other connection interfaces. The PSTN is any public switched telephone network provided by AT&T, GTE, Sprint, MCI, SBC, Verizon and others.

Preferred embodiments of the present invention include network devices and interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Data Over Cable Service Interface Specification (DOCSIS) Forum, Bluetooth Forum, or the ADSL Forum. However, network devices based on other standards could also be used.

IEEE standards can be found on the World Wide Web at the Universal Resource Locator (URL) "www.ieee.org." The ITU, (formerly known as the CCITT) standards can be found at the URL "www.itu.ch." ETSI standards can be found at the URL "www.etsi.org." IETF standards can be found at the URL "www.ietf.org." The NIST standards can be found at the URL "www.nist.gov." The ANSI standards can be found at the URL "www.ansi.org." The DOCSIS standard can be found at the URL "www.cablemodem.com." Bluetooth Forum documents can be found at the URL "www.bluetooth.com." WAP Forum documents can be found at the URL "www.wapforum.org." ADSL Forum documents can be found at the URL "www.adsl.com."

An operating environment for network devices and interfaces of the present invention include a processing system with one or more high speed Central Processing Unit(s) ("CPU") or other types of processors and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU executed" or "processor executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

As is known in the art, the Open Systems Interconnection ("OSI") reference model is a layered architecture that standardizes levels of service and types of interaction for network devices exchanging information through a communications network. The OSI reference model separates network device-to-network device communications into seven protocol layers, or levels, each building-and relying-upon the standards contained in the levels below it. The OSI reference model includes from lowest-to-highest, a physical, data-link, network, transport, session, presentation and application layer. The lowest of the seven layers deals solely with hardware links; the highest deals with software interactions at the application-program level.

As is known in the art, the Internet Protocol reference model is a layered architecture that standardizes levels of service for the Internet Protocol suite of protocols. The Internet Protocol reference model comprises in general from lowest-to-highest, a link, network, transport and application layer.

In one embodiment of the present invention, the wireless interfaces used for the plural target network devices 12, 14, 16 include but are not limited to, an IEEE 802.11a, 802.11b, 802.11g, 802.11n, "Wireless Fidelity" ("Wi-Fi"), "Worldwide Interoperability for Microwave Access" ("WiMAX"), ETSI High Performance Radio Metropolitan Area Network (HIPERMAN), "RF Home" or other wireless interfaces.

As is known in the art, 802.11b defines a short-range wireless network interface. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11xx interfaces can also be used and the present invention is not limited to the 802.11 protocols defined. The IEEE 802.11a, 802.11b and 802.11g standards are incorporated herein by reference.

As is known in the art, Wi-Fi is another type of 802.11xx interface, whether 802.11b, 802.11a, dual-band, etc. Wi-Fi devices include an RF interfaces such as 2.4 GHz for 802.11b or 802.11g and 5 GHz for 802.11a. More information on Wi-Fi can be found at the URL "www.weca.net."

As is known in the art, WiMAX is an industry trade organization formed by communications component and equipment companies to promote and certify compatibility and interoperability of broadband wireless access equipment that conforms to the IEEE 802.16xx and ETSI HIPERMAN. HIPERMAN is the European standard for MANs.

The IEEE The 802.16a and 802.16g standards are wireless MAN technology standard that provides a wireless alternative to cable, DSL and T1/E1 for last mile broadband access. It is also used as complimentary technology to connect IEEE 802.11xx hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. More information on WiMAX can be found at the URL "www.wimaxforum.org." WiMAX can be used to provide a wireless local loop (WLP).

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the URL "www.etsi.org."

The target devices 12, 14, 16 include a protocol stack with multiple layers based on the Internet Protocol or OSI reference model. The protocol stack includes, but is not limited to, TCP, UDP, IP, Hypertext Transfer Protocol (HTTP), Simple Mail Transfer Protocol (SMTP), Post Office Protocol version 3 (POP3), Internet Mail Access Protocol (IMAP), Voice-Over-IP (VoIP), instant-messaging (IM) and other protocols.

TCP provides a connection-oriented, end-to-end reliable protocol designed to fit into a layered hierarchy of protocols that support multi-network applications. For more information on TCP 58 see RFC-793, incorporated herein by reference.

UDP provides a connectionless mode of communications with datagrams in an interconnected set of networks. For more information on UDP see ITEF RFC-768, incorporated herein by reference.

IP is an addressing protocol designed to route traffic within a network or between networks. For more information on IP 54 see IETF RFC-791, incorporated herein by reference.

HTTP is a standard protocol for communications on the World Wide Web. For more information on HTTP, see IETF RFC-2616, incorporated herein by reference.

SMTP is a protocol for sending e-mail messages between devices including e-mail servers. For more information on SMTP, see IETF RFC-821 and RFC-2821, incorporated herein by reference.

POP3 is a protocol for a protocol used to retrieve e-mail from a mail server. For more information on POP3, see IETF RFC-1939, incorporated herein by reference.

IMAP is a protocol for retrieving e-mail messages from a server. For more information on IMAP, see IETF RFC-1730, incorporated herein by reference.

VoIP is a set of facilities for managing the delivery of voice information using IP 28 packets. In general, VoIP is used to send voice information in digital form in discrete data packets (i.e., IP 28 packets) over data networks 18 rather than using traditional circuit-switched protocols used on the PSTN. VoIP is used on both wireless and wired data networks.

VoIP typically comprises several applications (e.g., SIP, SLP, H.323, H.324, DNS, AAA, etc.) that convert a voice signal into a stream of packets (e.g., IP 28 packets) on a packet network and back again. VoIP allows voice signals to travel over a stream of data packets over a communications network 18.

As is known in the art, Session Initiation Protocol (SIP) supports user mobility by proxying and re-directing requests to a mobile node's current location. Mobile nodes can register their current location. SIP is not tied to any particular conference control protocol. SIP is designed to be independent of a lower-layer transport protocol and can be extended. For more information on SIP, see IETF RFC-2543, the contents of which are incorporated herein by reference.

As is known in the art, Service Location Protocol (SLP) provides a scalable framework for the discovery and selection of network services. Using SLP, network devices using the Internet need little or no static configuration of network services for network based applications. For more information on SLP see IETF RFC-2608, incorporated herein by reference.

As is known in the art, H.323 is one of main family of video conferencing recommendations for IP networks. The ITU-T H.323 standards entitled "Packet-based multimedia communications systems" dated February 1998, September 1999, November 2000 and July 2003 are incorporated herein by reference.

As is known in the art, H.324 is a video conferencing recommendation using Plain Old Telephone Service (POTS) lines. The ITU-T H.324 standards entitled "Terminal for low bit-rate multimedia communication" dated February 1998 and March 2002 are incorporated herein by reference.

As is known in the art, a Domain Name System (DNS) provides replicated distributed secure hierarchical databases that hierarchically store resource records under domain names. For more information on the DNS see IETF RFC-1034, RFC-1035, RFC-1591, RFC-2606 and RFC-2929, the contents of all of which are incorporated herein by reference.

As is known in the art, Authentication Authorization and Accounting (AAA) includes a classification scheme and exchange format for accounting data records (e.g., for call billing, etc.). For more information on AAA applications, see, IETF RFC-2924, the contents of which are incorporated herein by reference.

VoIP services typically need to be able to connect to traditional circuit-switched voice networks such as those provided by the PSTN. Thus, VoIP is typically used with the H.323 protocol and other multimedia protocols. H.323 and H.324 terminals such as multimedia computers, handheld devices, PDAs or other devices such as non-mobile and mobile phones connect to existing wired and wireless communications networks 18 as well as private wired and wireless networks.

H.323 and H.324 terminals implement voice transmission functions and typically include at least one voice codec (e.g., ITU-T CODECS, G.711, G.723, G.726, G.728, G.729, GSM, etc.) that sends and receives packetized voice data and typically at least one video codec (e.g., MPEG, etc.) that sends and receives packetized video data).

An Instant Message (IM) is a "short," real-time or near-real-time message that is sent between two or more end user devices such (computers, personal digital/data assistants (PDAs) mobile phones, etc.) running IM client applications. An IM is typically a short textual message. Examples of IM messages include America Online's Instant (AIM) messaging service, Microsoft Network (MSN) Messenger, Yahoo Messenger, and Lycos ICQ Instant Messenger, IM services provided by telecom providers such as T-Mobile, Verizon, Sprint, and others that provide IM services via the Internet and other wired and wireless communications networks. In one embodiment of the present invention, the IM protocols used meet the requirements of Internet Engineering Task Force (IETF) Request For Comments (RFC)-2779, entitled "Instant Messaging/Presence Protocol Requirements." However, the present invention is not limited to such an embodiment and other IM protocols not compliant with IETF RFC 2779 may also be used.

Alphanumeric Identifier Indexing for Advertising

FIG. 2 is a flow diagram illustrating a Method 27 for automatically indexing alphanumeric identifiers. At Step 28, plural alphanumeric identifiers are received on a source network device via a communications network. At Step 30, the plural alphanumeric identifiers are categorized into plural pre-determined advertising categories. At Step 32, the categorized plural alphanumeric identifiers are stored in a database associated with a source network device. At Step 34, a pre-determined advertisement is associated with the plural categorized alphanumeric identifiers.

Method 27 is illustrated with one exemplary embodiment. However, the present invention is not limited to such an embodiment and other embodiments can also be used to practice the invention.

At Step 28, plural alphanumeric identifiers are received on a source network device 20, 22, 24 via a communications network 18.

In one embodiment the alphanumeric identifier includes telephone numbers, instant message identifiers, or e-mail address identifiers, VoIP identifiers or IP identifiers.

In one embodiment, the plural alphanumeric identifiers are received on the source network device 20, 22, 24, in a bulk transfer from an alphanumeric identifier supplier (e.g., telephone service provider, instant message provider, e-mail provider, VoIP service provider, etc.) before any individual alphanumeric identifiers are received on the communications network 18.

In another embodiment, the plural alphanumeric identifiers are not received ahead of time but instead are dynamically received on the source network device 20, 22, 24 as they are received on the communications network 18.

At Step 30, the plural alphanumeric identifiers are categorized into plural pre-determined advertising categories. For examples, pre-determined advertising categories are created for virtually any type of goods, services, public service announcements, political advertisements, etc.

At Step 32, the categorized plural alphanumeric identifiers are stored in a database 20', 22', 24' associated with a source network device 20, 22, 24. In one embodiment, the database 20', 22', 24' uses advertising categories identical to those provided by a telephone service provider (e.g., yellow pages categories, etc.). In another embodiment, the database 20', 22', 24' uses other types of pre-determined advertising categories such as disconnected numbers, etc.

At Step 34, a pre-determined advertisement is associated with the plural categorized alphanumeric identifiers. The database 20', 22' 24' is used to track and match advertising for the pre-determined advertising categories.

In one embodiment, the pre-determined advertisement includes a recorded audio, video, graphical or electronic text advertisement.

In one embodiment, the pre-determined advertisements are sold to one advertiser for an advertising category. For example, for pizza restaurants, Domino's Pizza my purchase all advertising for pizza restaurants. Any alphanumeric identifiers received and categorized for pizza restaurants would be associated with Domino's Pizza advertising.

In another embodiment, the pre-determined advertisements are sold to plural advertisers for advertising categories. In such an embodiment, the pre-determined advertisements are associated based on a number of pre-determined methods such as round-robin method, a weighted method, depending on an amount of advertising purchased, etc.

Using Alphanumeric Identifier Indexing for Advertising

FIG. 3 is a flow diagram illustrating a Method 38 for using indexed alphanumeric identifiers. At Step 40, an alphanumeric identifier is received from a target device on a communications network. At Step 42, an advertising category being queried by the alphanumeric identifier is determined. At Step 44, a pre-determined advertisement is retrieved for the determined advertising category. At Step 46, a message is sent to the target device. The message allows the target device to receive information based on the alphanumeric identifier or receive the pre-determined advertisement instead.

Method 38 is illustrated with one exemplary embodiment. However, the present invention is not limited to such an embodiment and other embodiments can also be used to practice the invention.

In such an exemplary embodiment at Step 40, an alphanumeric identifier is received from a target device 12, 14, 16 on source network device 20, 22, 24 via a communications network 18. In one embodiment the alphanumeric identifier includes telephone numbers, instant message identifiers, or e-mail address identifiers, VoIP identifiers or IP identifiers.

At Step 42, an advertising category being queried by the alphanumeric identifier is determined using a database 20', 22' 24' associated with the source network device 20, 22, 24. For example, if a caller dialed 555-555-5555, on a mobile phone and the subscriber to that number was Pizza Hut, the source network device 20, 22, 24 on the communications network 18 would categorize that number as a restaurant, or more specifically, a pizza restaurant by sending the dialed number to an associated database 20', 22' 24'.

At Step 44, a pre-determined advertisement is selected for the advertising category from the database 20', 22' or 24'. For example, the source network device 20, 22, 24 matches the advertising category including restaurant information (e.g., a pizza restaurant, etc.) to a specific relevant pre-determined advertisement that is recorded and stored in a corresponding database 20', 22' or 24'.

At Step 46, a message is sent to the target device 12, 14, 16. The message allows the target device 12, 14, 16 to receive information based on the alphanumeric identifier or receive the pre-determined advertisement from the database 20', 22' or 24' instead.

In one embodiment, the message sent to the target device 12, 14, 16 including the pre-determined advertisement would be immediately displayed on the target device 12, 14, 16. The pre-determined advertisement might include the recorded announcement "Looking to order a pizza tonight? Domino's Pizza is offering a large pepperoni pizza, delivered hot and fresh to your door for $9.99. Press one to be connected to Domino's to take advantage of this great, money-saving offer, or press 2 to complete your call as dialed to Pizza Hut."

In another embodiment, the message sent to the target device 12, 14, 16 including the pre-determined advertisement allows a user to initiate to elect to display the advertisement, rather than immediately displaying the pre-determined advertisement. For example, in the above example, the message includes "Press 1 to hear about special, money-saving offers on pizza. Press 2 to connect your call."

In another embodiment, database 20', 22', 24' also could be utilized to send targeted print advertisements to subscribers based upon the types of queries placed from the target network device 12, 14, 16. For example, a residential mobile phone subscriber who frequently calls a number categorized in the database 20', 22', 24' as a florist might receive print advertisements or coupons for flowers in his phone bill, a separate bill either on paper or electronically. The subscriber's phone company could also sell this data to a print advertiser marketer or other businesses to target and mail print advertisement and/or coupons to residential phone customers based upon their calling habits.

In another embodiment, the target network device 12, 14, 16 includes application 26 with an internal database on a computer chip (e.g., ROM, flash, etc.), circuit board, and/or other hardware or firmware device installed or maintained inside the target network device 12, 14, 16. In such an embodiment, the internal database is updated periodically based on alphanumeric identifiers used and communications with the communications network 18.

Users of the method and system earn revenue in a number of ways. For example, phone companies could charge advertisers for each listing in the database, for each time a pre-determined advertisement is played, and/or for each call actually transferred to the advertiser's business at the conclusion of display of a pre-determined advertisement.

The method and system described herein provides an opportunity for advertising goods and services to the pubic in a way that is not currently being utilized. Each day, millions and millions of telephone calls are placed, millions or instant messages and e-mails are sent. Each day advertisers could reach millions of consumers by utilizing the method and systems. In addition, non-residential subscribers such payphone owners, hotel phone owners, telephone companies, and others could profit from use of this method and system on their telephones, telephone networks or other types of communications networks (e.g., IM, e-mail, etc.).

Users of the method and system could also store the phone numbers called from any particular phone, match those numbers to pre-determined advertising categories in the database 20' 22', 24', and maintain caller profiles including types of goods and services used by a particular caller for purposes of targeted marketing from direct mail or telemarketing.

It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. A method for automatically indexing alphanumeric identifiers, comprising:

receiving a plurality of alphanumeric identifiers on a source network device with one or more processors via a communications network, wherein the plurality of received alphanumeric identifiers include connectable and disconnected alphanumeric identifiers;

categorizing on the source network device the plurality of alphanumeric identifiers into a plurality of pre-determined advertising categories;

storing from the source network device the categorized plurality of alphanumeric identifiers in a database associated with the source network device;

associating on the source network device a plurality of pre-determined advertisements stored in the database with the plurality of categorized alphanumeric identifiers stored in the database;

receiving a target alphanumeric identifier on the source network device from a target network device with one or more processors via the communications network, wherein the target alphanumeric identifier is used to connect to a desired network device;

retrieving a pre-determined advertisement from the plurality of categorized alphanumeric identifiers stored in the database based on the received target alphanumeric identifier; and sending a message from the source network device to the target network device via the communications network, wherein the message includes electronic information that allows the target network device to make a selection input to connect to the desired network device or to receive and display the retrieved pre-determined advertisement and connect to another network device associated with the retrieved pre-determined advertisement instead.

2. A non-transitory computer readable medium having stored therein a plurality of instructions for causing one or more processors to execute the steps of:

receiving a plurality of alphanumeric identifiers on a source network device with one or more processors via a communications network, wherein the plurality of received alphanumeric identifiers include connectable and disconnected alphanumeric identifiers;

categorizing on the source network device the plurality of alphanumeric identifiers into a plurality of pre-determined advertising categories;

storing from the source network device the categorized plurality of alphanumeric identifiers in a database associated with the source network device;

associating on the source network device a plurality of pre-determined advertisements stored in the database with the plurality of categorized alphanumeric identifiers stored in the database;

receiving a target alphanumeric identifier on the source network device from a target network device with one or more processors via the communications network, wherein the target alphanumeric identifier is used to connect to a desired network device;

retrieving a pre-determined advertisement from the plurality of categorized alphanumeric identifiers stored in the database based on the received target alphanumeric identifier; and sending a message from the source network device to the target network device via the communications network, wherein the message includes electronic information that allows the target network device to make a selection input to connect to the desired network device or to receive and display the retrieved pre-determined advertisement and connect to another network device associated with the retrieved pre-determined advertisement instead.

3. The method of claim 1 wherein the step of receiving a plurality of alphanumeric identifiers includes receiving a bulk transfer of the plurality of alphanumeric identifiers before any individual alphanumeric identifiers are received on the communications network.

4. The method of claim 1 wherein the step of receiving a plurality of alphanumeric identifiers includes dynamically receiving the plurality of alphanumeric identifiers as they are received on the communications network.

5. The method of claim 1 wherein an individual alphanumeric identifier in the received plurality of alphanumeric identifiers includes a telephone number, voice-over-Internet Protocol identifier, an Internet Protocol identifier, an instant message identifier, an e-mail address identifier or a combination thereof.

6. The method of claim 1 wherein the plurality of pre-determined advertising categories includes pre-determined advertising categories for goods, services, public service announcements or political advertisements.

7. The method of claim 1 wherein the pre-determined advertisement includes a recorded audio, video, graphical, electronic text advertisement or combination thereof.

8. The method of claim 1 wherein the associating step includes associating all of the plurality of pre-determined advertisements stored in the database with all of the plurality of categorized alphanumeric identifiers stored in the database for a selected pre-determined advertising category based on advertising purchased by one single advertiser.

9. The method of claim 1 wherein the associating step includes associating the plurality of pre-determined advertisements stored in the database with the plurality of categorized alphanumeric identifiers stored in the database based on advertising purchased by a plurality of different advertisers.

10. The method of claim 1 further comprising:

receiving a second target alphanumeric identifier from the target network device on the source network device via the communications network to request a connection to a second desired network device;

determining on the source network device an advertising category being queried by the second target alphanumeric identifier using the database associated with the source network device;

retrieving on the source network device a pre-determined advertisement for the queried advertising category from the database; and sending a second message from the source network device to the target network device via the communications network, wherein the second message allows the target network device to immediately receive and display the retrieved pre-determined advertisement based on the second target alphanumeric identifier and allows the target network device to make a selection input to connect to the second desired network device or connect to another network device associated with the retrieved pre-determined advertisement instead.

11. The method of claim 1 further comprising:

storing in the database from the source network device target alphanumeric identifiers received from target network devices via the communications network;

matching the received target alphanumeric identifiers to the plurality of pre-determined advertising categories in the database; and maintaining profiles on the source network device for each target network device sending alphanumeric identifiers via the communications network, the profiles including a listing of types of goods and services queried by an individual target network device for purposes of targeted marketing from the source network device or for direct mail or telemarketing from other network devices.

12. The method of claim 10 wherein the second target alphanumeric identifier includes a telephone number, voice-over-Internet Protocol identifier, an Internet Protocol identifier, an instant message identifier, an e-mail address identifier or a combination thereof.

13. The method of claim 10 wherein the plurality of pre-determined advertising categories includes pre-determined advertising categories for goods, services, public service announcements or political advertisements.

14. The method of claim 10 wherein the pre-determined advertisement includes a recorded audio, video, graphical, electronic text advertisement or combination thereof.

15. The method of claim 10 wherein the retrieving step includes retrieving the pre-determined advertisement and all other advertisements from the database based on advertising purchased for a selected pre-determined advertising category by one single advertiser.

16. The method of claim 1 further comprising:
charging an advertiser a fee from the source network device for each pre-determined advertisement stored in the database;
charging an advertiser a fee from the source network device each time a pre-determined advertisement stored in the database is displayed on an individual target network device;
charging an advertiser a fee from the source network device for each connection actually transferred to an advertiser's network device at a conclusion of a display of a pre-determined advertisement stored in the database on an individual target network device.

17. The method of claim 1 further comprising:
generating a pre-determined print advertisement based on the received target alphanumeric identifier; and
sending the pre-determined print advertisement to a subscriber associated with the target network device.

18. An advertising indexing system, comprising in combination:
means for receiving a plurality of alphanumeric identifiers on a source network device with one or more processors via a communications network, wherein the plurality of received alphanumeric identifiers include connectable and disconnected alphanumeric identifiers, for categorizing on the source network device the plurality of alphanumeric identifiers into a plurality of pre-determined advertising categories, for storing from the source network device the categorized plurality of alphanumeric identifiers in a database associated with the source network device, for associating on the source network device a plurality of pre-determined advertisements stored in the database with the plurality of categorized alphanumeric identifiers stored in the database; and
means for receiving a target alphanumeric identifier on the source network device from a target network device with one or more processors via the communications network, wherein the target alphanumeric identifier is used to connect to a desired network device, for retrieving a pre-determined advertisement from the plurality of categorized alphanumeric identifiers stored in the database based on the received target alphanumeric identifier, for sending a message from the source network device to the target network device via the communications network, wherein the message includes electronic information that allows the target network device to make a selection input to connect to the desired network device or to receive and display the retrieved pre-determined advertisement and connect to another network device associated with the retrieved pre-determined advertisement instead and for sending a second message from the source network device to the target network device via the communications network, wherein the second message allows the target network device to immediately receive and display the retrieved pre-determined advertisement based on the second target alphanumeric identifier and allows the target network device to make a selection input to connect to the second desired network device or connect to another network device associated with the retrieved pre-determined advertisement instead.

19. The system of claim 18 wherein an individual alphanumeric identifier in the plurality of received alphanumeric identifiers includes a telephone number, voice-over-Internet Protocol identifier, an Internet Protocol identifier, an instant message identifier, an e-mail address identifier or a combination thereof.

20. The system of claim 18 wherein the plurality of pre-determined advertising categories includes pre-determined advertising categories for goods, services, public service announcements or political advertisements.

* * * * *